(12) United States Patent
Kipersztok

(10) Patent No.: US 8,380,731 B2
(45) Date of Patent: Feb. 19, 2013

(54) METHODS AND APPARATUS USING SETS OF SEMANTICALLY SIMILAR WORDS FOR TEXT CLASSIFICATION

(75) Inventor: Oscar Kipersztok, Redmond, WA (US)

(73) Assignee: The Boeing Company, Chicago, IL (US)

( * ) Notice: Subject to any disclaimer, the term of this patent is extended or adjusted under 35 U.S.C. 154(b) by 484 days.

(21) Appl. No.: 11/955,903

(22) Filed: Dec. 13, 2007

(65) Prior Publication Data

US 2009/0157611 A1  Jun. 18, 2009

(51) Int. Cl.
  *G06F 17/30* (2006.01)
(52) U.S. Cl. ............... 707/765; 707/728; 707/E17.071
(58) Field of Classification Search .................. None
  See application file for complete search history.

(56) References Cited

U.S. PATENT DOCUMENTS

| | | | |
|---|---|---|---|
| 5,680,606 A * | 10/1997 | Nakajima et al. ............... 706/52 |
| 5,893,092 A * | 4/1999 | Driscoll ............................. 1/1 |
| 5,907,841 A | 5/1999 | Sumita et al. |
| 6,088,692 A * | 7/2000 | Driscoll ............................. 1/1 |
| 6,330,576 B1 * | 12/2001 | Mochizuki et al. ........... 715/223 |
| 6,363,378 B1 * | 3/2002 | Conklin et al. ..................... 1/1 |
| 6,453,315 B1 | 9/2002 | Weissman et al. |
| 6,519,586 B2 * | 2/2003 | Anick et al. .................. 707/742 |
| 6,523,026 B1 | 2/2003 | Gillis |
| 6,810,376 B1 | 10/2004 | Guan et al. |
| 6,931,398 B2 * | 8/2005 | Namba .......................... 707/749 |
| 7,103,607 B1 | 9/2006 | Kirkwood et al. |
| 7,136,854 B2 | 11/2006 | Smith et al. |
| 7,634,454 B2 * | 12/2009 | Venolia et al. ......................... 1/1 |
| 7,644,047 B2 * | 1/2010 | Assadian et al. .................. 706/1 |
| 7,685,118 B2 * | 3/2010 | Zhang .............................. 706/55 |
| 7,730,050 B2 * | 6/2010 | Iketani et al. ................. 707/706 |
| 7,814,086 B2 * | 10/2010 | Bartz et al. .................... 707/708 |
| 7,895,193 B2 * | 2/2011 | Cucerzan et al. ............. 707/721 |
| 8,065,307 B2 * | 11/2011 | Haslam et al. ................ 707/738 |
| 2002/0099694 A1 * | 7/2002 | Diamond et al. ................. 707/3 |
| 2004/0064447 A1 * | 4/2004 | Simske et al. ..................... 707/5 |
| 2005/0203878 A1 * | 9/2005 | Brill et al. ......................... 707/3 |
| 2006/0122979 A1 * | 6/2006 | Kapur et al. ...................... 707/3 |
| 2006/0242130 A1 * | 10/2006 | Sadri et al. ........................ 707/3 |
| 2007/0011151 A1 * | 1/2007 | Hagar et al. ...................... 707/4 |
| 2007/0011154 A1 * | 1/2007 | Musgrove et al. ................ 707/5 |
| 2007/0073678 A1 | 3/2007 | Scott et al. |

* cited by examiner

*Primary Examiner* — Fred I Ehichioya
*Assistant Examiner* — Michelle Owyang
(74) *Attorney, Agent, or Firm* — Armstrong Teasdale, LLP

(57) ABSTRACT

A computer-based searching method is described that includes receiving, at a computer, a search concept that includes a plurality of principal words, determining a set of semantically similar words for at least one of the principal words, calculating a degree of membership for each word in each set that reflects a semantic similarity in meaning to the principal word of the set, performing the search, computing a score based at least on the degrees of membership for the words in the word set, and sorting the results using the computed scores.

19 Claims, 6 Drawing Sheets

| Ranking | Concept | Pro/Con | #Available ... | #Selected |
|---|---|---|---|---|
| | | | | |
| 86.54 | Unchanged of Ability to enrich higher grade Uranium 235 | Unbiased | 60 | 0 |
| 16.97 | Increased of Ability to procure centrifuges | Source | 17 | 0 |

Figure 5a

Concept Increased of Ability to manufacture centrifuges

Articles (52)

| Rank | Title | Author | In... |
|---|---|---|---|
| 16.53 | "Green Party of Iran - News" | | |
| 9.49 | "An Iranian bomb_thebulletin_org" | | |
| 9.27 | "Carnegie Endowment for Intern... | | |
| | | | |
| 8.99 | "Iran, player or rogue_thebulleti... | | |
| 8.03 | "Iran's Nuclear Activities" | | |
| 7.55 | "wponac Don't Underestimate th... | | |
| 7.32 | "nti country overviews iran nucle... | | |
| 6.6 | "Hard Target Rolling-Back Iran'a... | | |
| 6.55 | "Iran's Continuing Pursuit of We... | | |
| 6.3 | "Iran Tehran To Resume Building... | | |
| 6.1 | "Iran Proposal to the EU Falls Fa... | | |
| 5.34 | "Guardian Unlimited Special repo... | | |
| 5.01 | "wPOMAC Iran's Nuclear Program" | | |
| 4.91 | "Arms Control Association Arms ... | | |
| 4.74 | "Ephraim Kam - STRATEGIC ASS... | | |
| 4.25 | "CEIP Iran's Programs to Produc... | | |
| 4.04 | "Arms Control Association Arms ... | | |
| 3.81 | "Iran Nuclear Update, 2003" | | |
| 3.81 | "wPOMAC Iran Nuclear Archives... | | |
| 3.12 | "AxisofLogic- Iran-Persia" | | |
| 2.95 | "CNS - A Preemptive Attack on I... | | |

Info | All Paragraphs | Selected Paragraphs | Article Text | Note

Paragraphs (32)

☐ 2.88 "The buildings at Natanz also house centrifuge testing and assembly facilities. A network of companies located elsewhere makes centrifuge components and sends them to Natanz for final testing and assembly. El Baradei and his team also saw enough components at Natanz for another 1,000 machines."

☐ 1.99 "After some delays, Mohamad El Baradei, the head of the International Atomic Energy Agency (IAEA), visited Iran in late February. That visit confirmed that Iran has joined an exclusive club of some 10 nations that can build gas centrifuges. Its centrifuge technology is considerably further along than Iraq's was at the time of the 1991 Persian Gulf war."

☐ 1.85 "Nearby are huge underground buildings, built to a depth of..."

☐ 1.18 "The Russian government, the supplier of the Bushehr power..."

☐ 0.79 "Iran increased IAEA officials' suspicions by claiming that..."

☐ 0.37 "A facility near Tehran known by its front name of Kala...."

Fig. 5B

METHODS AND APPARATUS USING SETS OF SEMANTICALLY SIMILAR WORDS FOR TEXT CLASSIFICATION

BACKGROUND OF THE INVENTION

This invention relates generally to searching of documents, and more specifically, to methods and apparatus using sets of semantically similar words for text classification.

Many text classifiers in use today rely on words or combinations of words, which are sometimes referred to as keywords, for retrieval of information or documents. Such text classifiers are typically used in computer search engines and utilize word matching processes. The process of word matching allows for the identification of documents, paragraphs or sentences. The assumption is that by identifying and searching several selected key words, which are likely used together in a document, paragraph or sentence, the content of the retrieved document will contain information of interest to the user.

The existing solutions retrieve information based on one or more of these keywords and, while effective, they often retrieve tens of thousands and sometimes millions of documents. To find the best available information, the user has to manually inspect the documents. In other words, the user is left with the task to inspect those retrieved documents looking for the specific information requested.

BRIEF DESCRIPTION OF THE INVENTION

In one aspect, a computer-based searching method is provided. The method includes receiving, at a computer, a search concept that includes a plurality of principal words, determining a set of semantically similar words for at least one of the principal words, calculating a degree of membership for each word in each set that reflects a semantic similarity in meaning to the principal word of the set, performing the search, computing a score based at least on the degrees of membership for the words in the word sets and sorting the results using the computed scores.

In another aspect a computer is provided that is programmed to receive, via a computer interface, a search concept query that includes a plurality of principal words, amplify at least one of the principal words to a set of semantically similar words, calculate a degree of membership for each word in each set that reflects a similarity in meaning to the principal word of the set, perform the search utilizing each of the sets, and compute a score for each document resulting from the search based at least on the degrees of membership for the words in the principal-word sets and use that score to rank the documents.

BRIEF DESCRIPTION OF THE DRAWINGS

FIG. 5a illustrates an example of results of the use of the classifier in domain dealing with an ability to create a nuclear weapon, including three concepts of interest.

FIG. 5b illustrates a list of the documents, listed according to a ranking, including identified paragraphs for a selected document, ranked by their corresponding score.

DETAILED DESCRIPTION OF THE INVENTION

The various embodiments described herein improve the precision and recall associated with text classifiers, or search engines, in general. The improvement comes about by allowing users to expand keywords, based on which the search is to be conducted, into sets of semantically similar words. This keyword expansion provides a better specification of the meaning of the keywords chosen by the user. More specifically, the keyword expansion allows the user to improve the search for text or information by identifying similar, semantically related words to each keyword for use in the search, and also determining the degree of similarity to the principal keyword.

As described above, some text classifiers used in search engines for information or document retrieval, rely on "keywords" or queries that are typically entered through a user interface by a user. Other classifiers utilize learning algorithms which are trained using training "data sets". These training sets are documents classified, a priori, by hand and the learning algorithms use word frequencies or word combination frequencies to adjust the parameters of the classifier. New documents with word frequencies similar to those present in the training set are classified in a similar way under the assumption that documents with similar words will also have similar semantic content.

Figure 1:
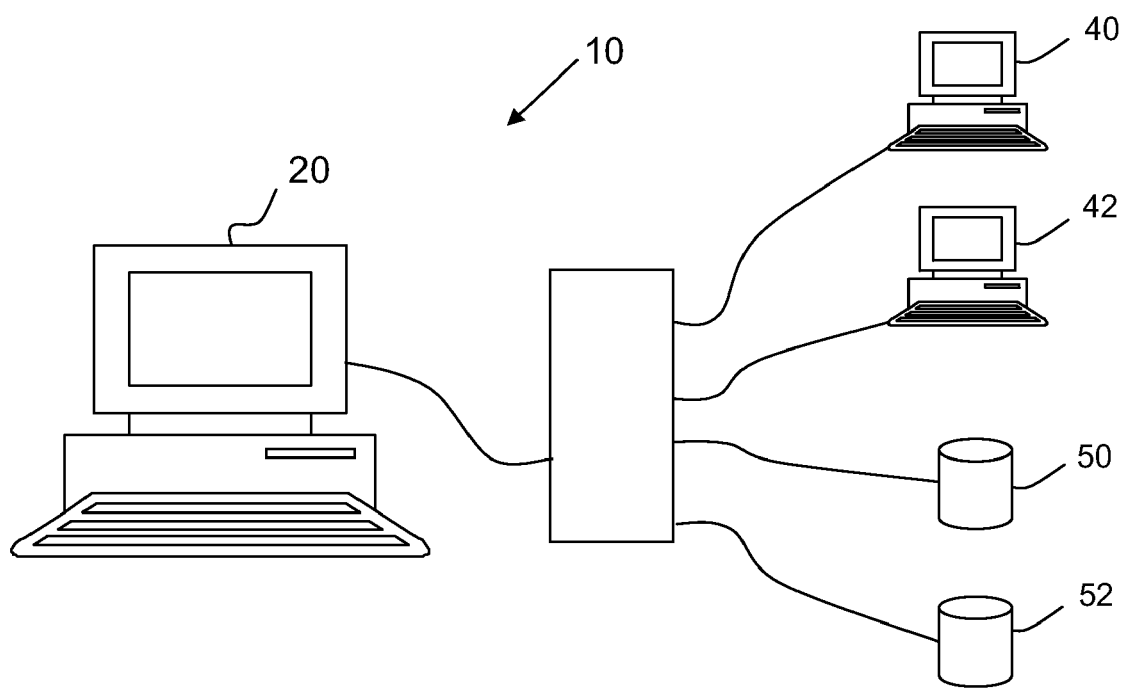
FIG. 1 is an illustration of a computer interfaced to a network.

FIG. 1 is a simplified diagram of a networked computer system 10. Computer system 10 includes a user computer 20 that is interfaced to a network 30. Through the network 30, computer 20 is able to communicate with computers 40 and 42 and also able to access databases 50 and 52. The network 30 is representative of a number of networks including the Internet, an Intranet, and a local area network, to name a few. In a typical searching application, especially text searching, a user of computer 20 accesses a user interface which allows them to enter search terms, concepts or queries. Upon entry of the search terms, the computer 20 sends one or more messages across the network 30 to computers 40, 42, and databases 50, 52. In response, computers 40, 42, and databases 50, 52 respond back to computer 20 over the network 30 with data corresponding to the respective files that have the search terms therein. The searching application running on computer 20 receives this data and compiles it for presentation to the user on the user interface of the computer 20. In most known application this presentation is in the form of a list, where each item is selectable for further review by the user.

The embodiments herein describe a method, operable for example on computer network 30 or individually on computer 20, that extends the notion of keywords (e.g., search terms) to the use of sets of semantically similar words. While described herein in the context of keywords, the embodiments are also applicable to phrases and compound phrases. In the embodiments, one or more words or phrases are utilized as keywords, and subsequently are referred to individually as principal words. The principal words are then subjected to an amplification process. In the amplification process, each word is expanded or extended into a set of words with similar semantic meaning to the corresponding principal word.

The amplification process is further illustrated by example, which is an example of a query input into to a search engine, specifically, "detection of a facility for building gadgets". In this document, the query is referred to as a concept of interest. Typically, the query is a well-formed sentence, but it is not a requirement. A query such as the above phrase can be represented by a collection of principal words, which is built into a classifier to search for text or documents with content related to this concept of interest. An example of a collection of principal words corresponding to the example query is as follows: collection=(detection, facility, building, gadgets).

Figure 2:
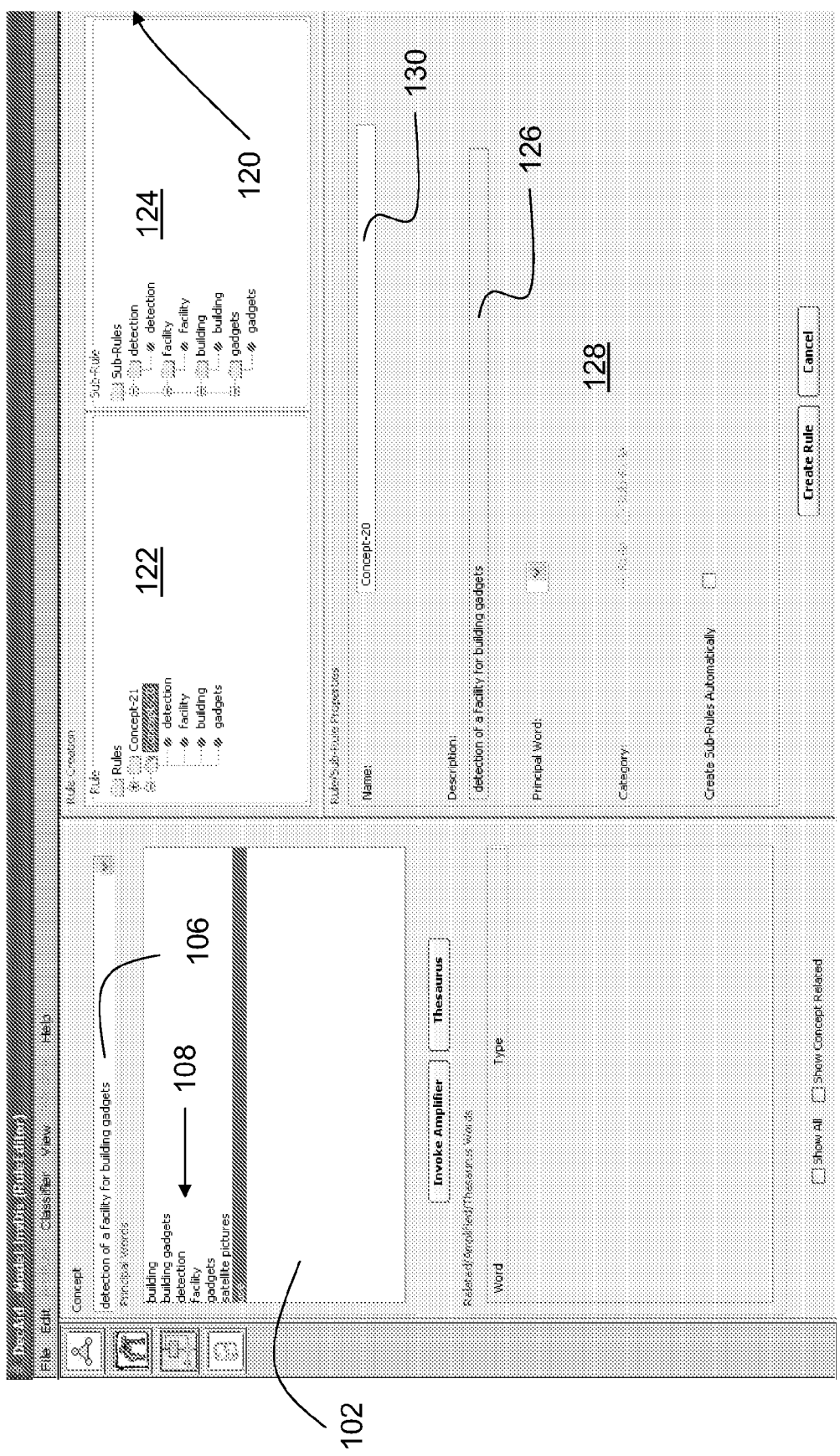
FIG. 2 is a first user interface for breaking the concept queries into principal words, amplifying each principal word into a set of semantically similar words, building a rule-based classifier from conjunctions of principal-word sets and running the classifier against a corpus of documents to search and retrieve the information requested by the concept query.

Each of the principal words in the collection is amplified into a set of semantically similar words. For example, and as shown in FIG. 2, the word "building" is a principal word and is supplemented by an expanded set of words as follows: Set 1=amplified set associated with the principal word "building"=(building, installing, fabricating, constructing, creating, manufacturing).

One importance of amplifying "building", as illustrated by Set 1, is to reduce ambiguity, since the word "building" can be used as both a noun and as a verb (verb usage is shown by Set 1). As a noun "building can also mean "edifice". To reflect this other meaning, another amplified set for the principal word "building" is shown as Set 2=(building, installation, facility, edifice, structure, tower, villa, lodge, chateau, palace, mansion).

In Set 2 the principal word "building" refers to a specific physical structure, an entirely different meaning as referred to "building" in Set 1. Depending on the context used for each principal word in the query, the other words of the amplified set are added accordingly.

Amplification of each principal word (e.g., a set of semantically similar words output by computer system 20) can be further represented by a fuzzy set. Fuzzy sets are sets where each member has a degree of membership to the set. In Set 1, the word "building", itself a member of the amplified set, gets assigned a membership weight of one. The member word "fabricating" is close to the meaning of the principal word "building" as used in the concept query: "detection of a facility for building gadgets", The same is true for the word "creating". As a result, the member words "fabricating" and "creating" in Set 1 receive a higher membership weight (e.g., 0.9) than does the word "installing" which is assigned a membership weight of 0.4.

As illustrated, the amplified fuzzy set associated with the principal word "building" is composed of a set of member words, each paired with a membership weight that reflects the similarity in meaning to the principal word of the set. Each member word is amplified according to the context of the principal word used in the concept. For example, the principal word "building" in "detection of a facility for building gadgets" is amplified to Set 1. The fuzzy set associated with the intended meaning for the word "building" follows:

Fuzzy Set 1=Amplified fuzzy set for principal word "building"=(building 1, installing 0.4, fabricating 0.9,constructing 0.85,creating 0.9,manufacturing 0.75).

In one embodiment, the membership weights are subjective numbers determined and entered by the user that denote how close the meaning of each member word is to meaning of the principal word for the set. In regard to the above descriptions, one purpose is to create an improved classifier that uses the amplified word sets to improve the accuracy of the information or document search. In the embodiment, the accuracy of the classifier depends largely on the amplification of the principal word to a word set done by the user. More specifically, the amplification of the principal words is done by the user to narrow the meaning of each principal word used in a concept and make it less ambiguous. The choice of words to include in the amplified set by the user contributes to make the meaning of the query less ambiguous, resulting in a more accurate classifier. When sorting the search results, in one embodiment, a score is computed for each document, paragraph or sentence that is obtained from a rule. The score is calculated at least in part based on the degree of membership assigned to each word in the fuzzy set of semantically similar words. A more general algorithm may be used to compute the scores that contains other heuristics in addition to the degree of membership of each word in the set.

Figure 3:
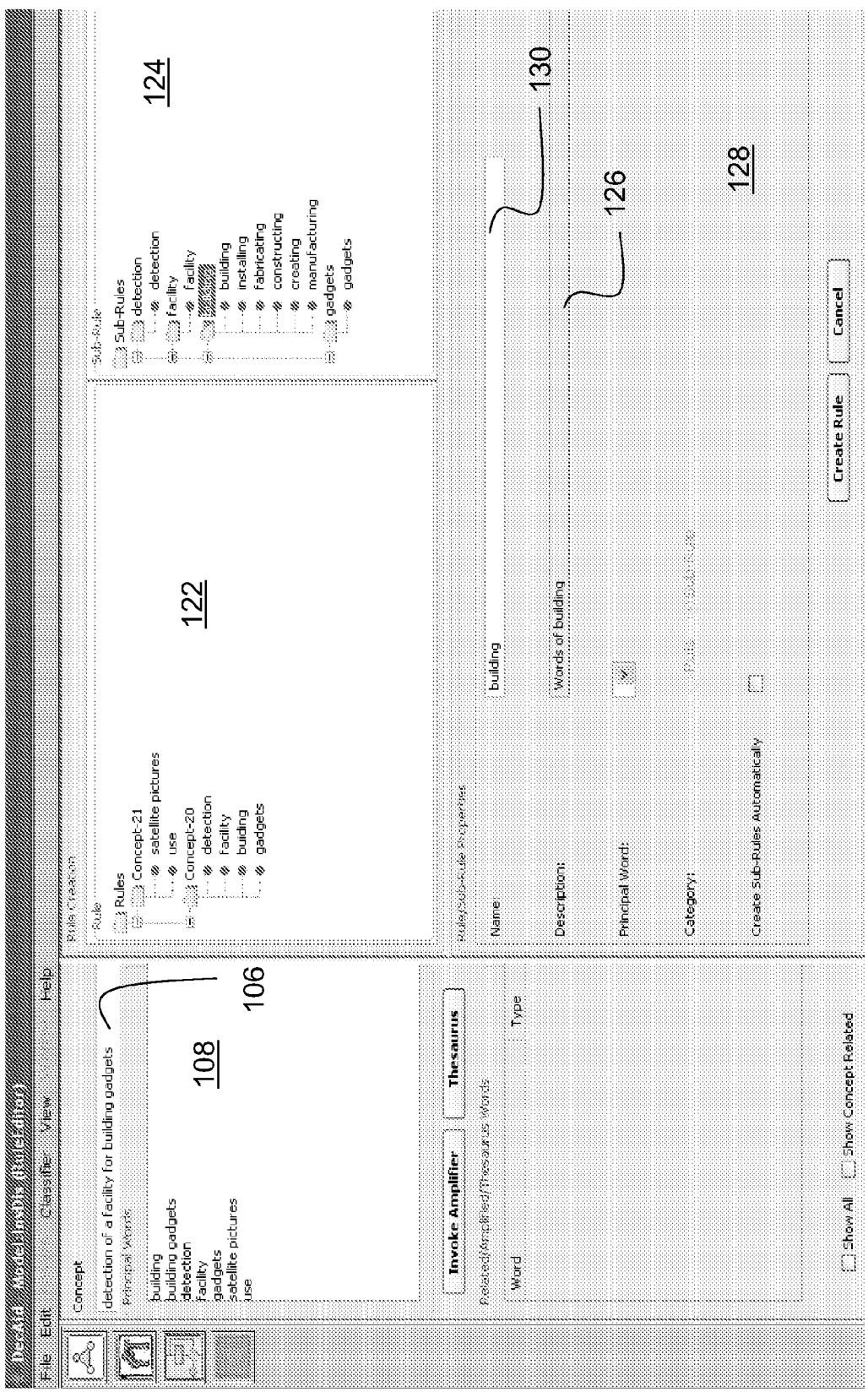
FIG. 3 is a user interface illustrating the classifier rules of conjunctions of principal word-sets and the associated sub-rules illustrating the disjunction of the semantically similar words in each principal word set.

In another embodiment, a utility facilitates the construction of the amplified word sets by the user. FIGS. 2 and 3 illustrate a user interface 100 that enables a user to perform the construction function. FIG. 2 is a first user interface 100 for breaking the concept queries into principal words, amplifying each principal word into a set of semantically similar words, building a rule-based classifier from conjunctions of principal-word sets and running the classifier against a corpus of documents to search and retrieve the information requested by the concept query. FIG. 3 is a version of user interface 100 that illustrates the classifier rules of conjunctions of principal word-sets and the associated sub-rules illustrating the disjunction of the semantically similar words in each principal word set.

Referring specifically to the Figures, an upper left quadrant 102 of the user interface 100 describes a natural language processing utility that takes a concept sentence 106 and breaks it into "principal" words or phrases 108. These principal words 108 are listed in the window below the concepts. A rule creation window 120 includes both a rule window 122 and a sub-rule window 124. Each concept is represented in a rule by a conjunction of principal words or phrases that are amplified to fuzzy sets.

For example, FIG. 2 includes a rule denoted as Concept 20. A description Concept 20 rule is shown in a description text entry bar 126 of a rule/sub-rule properties window 128. Concept-20 is shown in a "name" text entry bar 130 of FIG. 2. The description for the Concept 20 rule is "detection of a facility for building gadgets" and as shown in rule window 122, it is represented by a conjunction of four principal words: detection, facility, building and gadget.

Rule for Concept-20=detection^facility^building^gadget.

The symbol "^" used above represents the conjunctive or logic symbol AND. When all four principal words, or combinations of corresponding semantically-similar words obtained from their amplified sets, occur within the same document, paragraph or sentence the Rule is invoked and a score is computed. The sub-rule window 124 shows each of the four principal words as a "set" with itself as a single word member in it as default. In FIG. 3, the word "building" has been amplified to include all the members of Set 1, as shown by the "name" text entry bar 130. In Rule for Concept-20, the amplified set for the word "building" are replaced by a disjunction of its set members.

Rule for Concept-20=(detection)^(facility)^(building,vinstalling,vfabricating,v constructing,v creating,vmanufacturing)^(gadget).

The symbol "v" used above represents the disjunctive or logical symbol OR.

The document classifier is built by combinations of the rules conjunctions and the sub-rules disjunctions. In the lower left quadrant of FIGS. 2 and 3, "Invoke Amplifier" and "Thesaurus" buttons are included. In one embodiment, the thesaurus button connects the user to several public domain dictionaries and thesauri. The intention is that the user will use those utilities to find words to "amplify" the principal words into their amplified sets. The invoke amplifier button is another utility that helps the user in a more automated fashion by suggesting new words to add to the amplified sets. The amplifier utility uses a learning algorithm that uses an initial principal word or the first few words added to the set by the user. In every iteration the utility learns the intended meaning of the principal word and subsequently looks for other words of similar semantic content to the words already selected. The new words are presented to the user and the user selects those that he or she want to add to the set. The algorithm also automatically computes the fuzzy membership weight associated with each of the words included in the set.

The rules and sub-rules generated are used by the classifier together with the membership weights to compute the score for each instance of a rule found in a document. Fuzzy logic conjunctions and disjunction operators are used to contribute towards the computation of the score. For example, the intersection or conjunction of two fuzzy sets uses the min function to compute the membership weight of the resulting conjunction. So, in the example of the Concept-20 rule one instance of the conjunction could be:

Concept 20 Rule 1=(detection 1.0)^(location 0.8)^
(fabricating 0.9)^(gadget 1.0).

For this hypothetical instance that finds the word "location" with membership weight 0.8 from the "facility" principal word set; and the word "fabricating" with membership 0.9 from the "building" principal word set, the weight for this conjunction instance is computed as follows:

Concept 20 Rule 1 weight=Min(1.0,0.8,0.9,1.0)=0.8

In a second instance of the conjunction:

Concept 20 Rule 2=(detection 1.0)^(location 0.8)^
(installing 0.4)^(gadget 1.0).

The word "installing" with membership weight 0.4 is found from the "building" principal word set. For this instance the conjunction weight is computed as follows:

Concept 20 Rule 2 weight=Min(1.0,0.8,0.4,1.0)=0.4

In the second instance, the conjunction weight is 0.4 so it will contribute towards a lower score than the 0.8 weight computed for the first conjunction.

Other, additional heuristics are used in combination with the fuzzy arithmetic for computing such scores. For example, in one specific embodiment, the distance between individual conjunctive words in a rule occurring within a sentence, within a paragraph, or within a document is used. In the example, the score increases as the distance between the words in a rule decreases.

Figure 4:
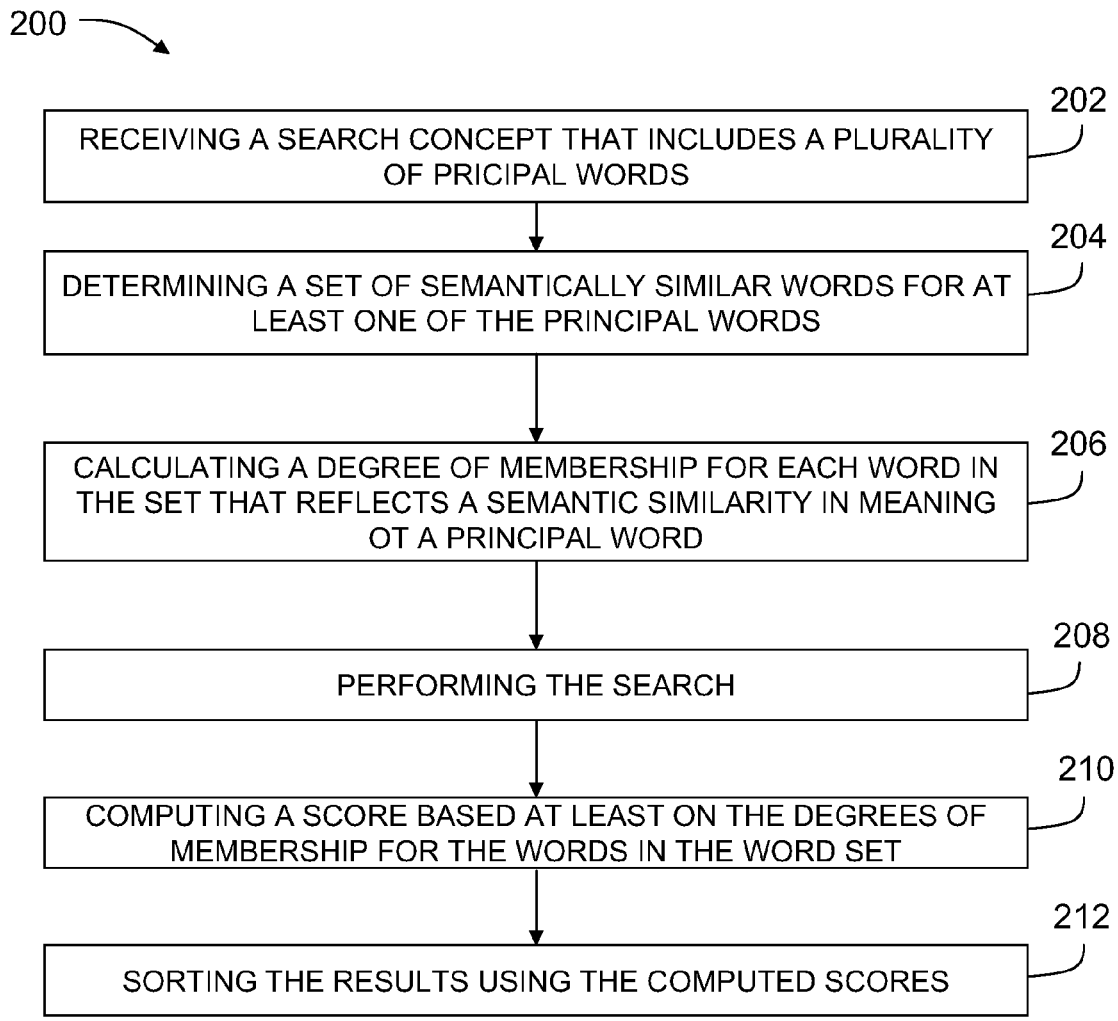
FIG. 4 is a flowchart illustrated a process utilized by the word searching program.

FIG. 4 is a flowchart 200 that more generally illustrates a process that is performed, for example, by computer 20 (shown in FIG. 1) when it is utilized in a search concept as described extensively herein. More specifically, flowchart 200 illustrates a computer-based searching method that includes receiving 202, for example at a computer, a search concept that includes a plurality of principal words. The method continues by determining 204 a set of semantically similar words for at least one of the principal words and calculating 206 a degree of membership for each word in each set that reflects a similarity in meaning to the principal word of the set. The computer performs 208 the search, and computes 210 a score based at least on the degrees of membership for the words in the word set. The results are sorted 212 using the computed scores.

FIG. 5 shows an example of results of the use of the classifier in domain dealing with an ability to create a nuclear weapon. The concept of interest is "Ability to manufacture centrifuges". The classifier created retrieved 52 documents, as shown in FIG. 5a, that were associated with this concept and that classification received the high score of 182.38. FIG. 5b shows a list of the documents, listed according to a ranking. For the fourth highest ranked document, with ranking, or score, of 9.06, six paragraphs are identified, shown on the right, also in ranking order with their corresponding score.

The above described embodiments extend the use of keywords to the use of sets of words of similar semantic meaning. One method described herein utilizes the classification of sentences in the retrieval process that are related to the query by using additional words, thereby more accurately and less ambiguously identifying the specific information requested by the user. Another method is the conversion of each user principal keyword used in the query into a set of words and thereafter assigning to each word in the set, a number that reflects the degree of semantic similarity to the principal word. All words in the set are used to identify relevant content requested by the user. In summary, replacing keywords with sets of semantically similar words improves the search result for a user's requested information and helps the user to get to the desired information more quickly and efficiently.

While the invention has been described in terms of various specific embodiments, those skilled in the art will recognize that the invention can be practiced with modification within the spirit and scope of the claims.

What is claimed is:

1. A computer-based searching method comprising:
a) receiving, at a computer, a search concept that includes a plurality of principal words;
b) determining a set of semantically similar words for at least one of the principal words, wherein the principal words are extracted from the search concept using a natural language processing utility;
c) receiving, at the computer, user input for improving the set of semantically similar words and a degree of membership for individual words within the set of semantically similar words to generate improvement in search results, wherein the user input includes an addition of one or more words to the set of semantically similar words;
d) calculating, based on user input, a degree of membership for each word that reflects a semantic similarity in meaning to the principal word of the set with which each word is associated;
e) performing a search using at least the set of semantically similar words;
f) computing a score for each search result based at least on the degrees of membership for each of the semantically similar words used in the search and that at least one of the principal words, wherein computing the score for each search result comprises:
determining the degree of membership corresponding to each of the semantically similar words included in the search result and the at least one of the principal words to create a set of membership weights; and determining which membership weight among the determined set of membership weights is a minimum membership weight;

selecting the minimum membership weight among the determined set of membership weights to be the score for the search result; and g) sorting and displaying results of the search using the computed scores.

2. The computer-based searching method according to claim 1 wherein determining a set of semantically similar words and calculating a degree of membership for each word comprise manually entering the similar words and degree of membership into a user interface.

3. The computer-based searching method according to claim 1 wherein determining a set of semantically similar words comprises creating a rule for the search concept that includes a conjunction of principal words.

4. The computer-based searching method according to claim 3 wherein determining a set of semantically similar words comprises creating at least one sub rule where each sub rule is a disjunction of the set of semantically similar words.

5. The computer-based searching method according to claim 4 wherein calculating a degree of membership comprises combining at least one rule and one sub rule.

6. The computer-based searching method according to claim 1 wherein determining a set of semantically similar words comprises determining the set of semantically similar words utilizing a computer-based utility.

7. The computer-based searching method according to claim 1 wherein determining a set of semantically similar words comprises selecting the set of semantically similar words from at least one of an on line thesaurus and words suggested via a computer database.

8. The computer-based searching method according to claim 1 wherein calculating a degree of membership comprises utilizing a computer utility to calculate the degree of membership for a semantically similar word.

9. The computer-based searching method according to claim 8 wherein utilizing a computer utility to calculate the degree of membership comprises subsequently adjusting the degree of membership for the word utilizing a computer learning process.

10. The computer-based searching method according to claim 1 wherein calculating a degree of membership comprises calculating a degree of membership for a principal word based on a distance from other principal words in a search concept of a plurality of principal words.

11. The computer-based searching method according to claim 1 wherein sorting the results comprises calculating a score for each rule comparison at least in part based on an algorithm and a degree of membership for each word in the semantically similar set.

12. The computer-based searching method according to claim 1 wherein the principal word comprises a phrase that includes multiple individual words.

13. A computer comprising at least a processing device and a memory operable to store executable instructions to be executed by said processing device, said computer programmed to:

receive, via a computer interface, a search concept query that includes a plurality of principal words;

extract the principal words from the search concept query using a natural language processing utility;

amplify at least one of the principal words to a set of semantically similar words;

receive, via the computer interface, user input for improving the set of semantically similar words and a degree of membership for individual word within the set of semantically similar words to generate improvement in search results, wherein the user input includes an addition of one or more words to the set of semantically similar words;

calculate a degree of membership for each word that reflects a similarity in meaning to the principal word of the set with which each word is associated;

perform a document search utilizing each of the set of semantically similar words;

compute a score for each search result document at least in part by:

determining the degree of membership corresponding to each of the semantically similar words included in the search result document and the at least one of the principal words to create a set of membership weights; and determining which membership weight among the determined set of membership weights is a minimum membership weight;

selecting the minimum membership weight among the determined set of membership weights to be the score for the search result;

use the computed scores to rank the search result documents; and display the search result documents.

14. The computer according to claim 13 further comprising a user interface for user entry of at least one of semantically similar words and manually determined degrees of membership for the principal words and the semantically similar words.

15. The computer according to claim 13 further programmed to:

create a rule for the search concept that includes a conjunction of principal words for the search concept; and create at least one sub rule, each sub rule being a disjunction of the set of semantically similar words associated with one of the principal words.

16. The computer according to claim 13 further programmed for at least one of:

selecting a set of semantically similar words for a principal word utilizing at least one of an online dictionary and an on line thesaurus; and selecting a set of semantically similar words for a principal word from words suggested via a computer database.

17. The computer according to claim 13 further programmed to calculate the degree of membership for selected semantically similar words.

18. The computer according to claim 13, wherein to calculate a degree of membership, said computer is programmed to calculate the degree of membership for a principal word based on a proximity to other principal words in a search concept that includes a plurality of principal words.

19. The computer according to claim 13, wherein to calculate a degree of membership, said computer is programmed to adjust the degree of membership for each semantically similar word through execution of a learning utility.

* * * * *